United States Patent
Altinel et al.

(10) Patent No.: US 10,892,651 B2
(45) Date of Patent: Jan. 12, 2021

(54) COMBINED MULTI-SOURCE ENERGY HARVESTING AND COMMUNICATION MANAGEMENT SYSTEM

(71) Applicant: ISTANBUL TEKNIK UNIVERSITESI, Istanbul (TR)

(72) Inventors: Dogay Altinel, Istanbul (TR); Gunes Zeynep Karabulut Kurt, Istanbul (TR)

(73) Assignee: ISTANBUL TEKNIK UNIVERSITESI, Istanbul (TR)

(*) Notice: Subject to any disclaimer, the term of this patent is extended or adjusted under 35 U.S.C. 154(b) by 0 days.

(21) Appl. No.: 16/468,685

(22) PCT Filed: May 21, 2018

(86) PCT No.: PCT/TR2018/050254
§ 371 (c)(1),
(2) Date: Jun. 12, 2019

(87) PCT Pub. No.: WO2019/032072
PCT Pub. Date: Feb. 14, 2019

(65) Prior Publication Data
US 2020/0083757 A1    Mar. 12, 2020

(30) Foreign Application Priority Data

Jun. 29, 2017 (TR) ................. 2017/09581

(51) Int. Cl.
*H02J 50/80* (2016.01)
*H04B 17/24* (2015.01)
*H02J 50/10* (2016.01)
*H02J 50/20* (2016.01)
*H02J 50/30* (2016.01)

(52) U.S. Cl.
CPC .............. *H02J 50/80* (2016.02); *H02J 50/10* (2016.02); *H02J 50/20* (2016.02); *H02J 50/30* (2016.02); *H04B 17/24* (2015.01)

(58) Field of Classification Search
CPC .. H02J 50/10; H02J 50/20; H02J 50/30; H02J 50/80; H04B 17/24
USPC ........................................................ 307/104
See application file for complete search history.

(56) References Cited

U.S. PATENT DOCUMENTS

| | | |
|---|---|---|
| 9,197,143 B1 | 11/2015 | Townsend et al. |
| 2012/0068669 A1 | 3/2012 | Trainor et al. |
| 2012/0206096 A1 | 8/2012 | John |
| 2014/0366927 A1 | 12/2014 | Lavrova et al. |
| 2016/0211742 A1 | 7/2016 | Mohammad et al. |
| 2016/0336810 A1* | 11/2016 | Mortazawi ............. H02J 50/12 |
| 2017/0170675 A1 | 6/2017 | Ni Scanaill et al. |

FOREIGN PATENT DOCUMENTS

| | | |
|---|---|---|
| WO | 2014007498 A1 | 1/2014 |
| WO | 2016109313 A1 | 7/2016 |

* cited by examiner

*Primary Examiner* — Hal Kaplan
(74) *Attorney, Agent, or Firm* — Bayramoglu Law Offices LLC

(57) ABSTRACT

A combined multi-source energy harvesting and communication management system which enables to obtain high efficiency energy by means of the configuration among the energy control interface (6), the energy combiner (7), the energy storage and transfer unit (8), the memory (9), the energy management unit (10) and the communication management unit (11).

2 Claims, 4 Drawing Sheets

US 10,892,651 B2

COMBINED MULTI-SOURCE ENERGY HARVESTING AND COMMUNICATION MANAGEMENT SYSTEM

CROSS REFERENCE TO THE RELATED APPLICATIONS

This application is the national phase entry of International Application No. PCT/TR2018/050254, filed on May 21, 2018, which is based upon and claims priority to Turkish Patent Application No. 2017/09581, filed on Jun. 29, 2017, the entire contents of which are incorporated herein by reference.

TECHNICAL FIELD

The invention is related to a combined multi-source energy harvesting and communication management system which enables the communication devices to meet their own energy requirements.

The invention is more particularly related to a combined multi-source energy harvesting and communication management system which enables to obtain high efficiency energy by the configuration among the energy control interface, energy combiner, energy storage and transfer unit, memory, energy management unit and communication management unit.

BACKGROUND

In practice, commonly, wireless and mobile communication devices are provided with energy, by means of disposable or rechargeable batteries.

Besides this, studies are being carried out for obtaining energy from a particular energy source which is in the environment of the devices that consume low power (on low milliwatt or microwatt level). With this method called energy harvesting, it is aimed for the devices to meet their own energy requirements.

Various improvements have been carried out that are related to energy harvesting in the art.

In the United States patent document numbered US2016211742 of the known state of the art; a multi-source energy collection system which is adapted to collect energy from different energy sources of the environment including solar energy, thermal energy and vibration, which is stand alone and self-operating, is described. Energy retrieved from different sources are combined with minimum energy loss by means of an energy combiner. A time interval is assigned to energy harvesters according to a particular threshold value by using the switching control logic circuit and the switching matrix. Distribution of the necessary voltage level from the storage unit to different loads is provided by means of a power management unit. The power management unit uses a power gating technique to provide the energy distribution according to the energy need of the loads.

In the document numbered WO2014007498 of the known state of the art, a system composed of mobile stations and base stations which operate on energy harvesting is present. In the system, by using the communication channels between the base station and the mobile station, the way they are supposed to communicate according to their energy levels is decided. If the energy level of the base station is under a certain value, the mobile station communicates with the base station in the configuration to ensure that the base station consumes less energy.

In the United States patent document numbered U.S. Pat. No. 9,197,143 of the known state of the art; a multi-source energy harvesting system is mentioned. The system contains energy harvesting and an energy transducer. Diodes are connected between the energy harvesting components and the energy storage devices. The diodes are guided in order to prevent the distribution of incoming energy in the adder circuit.

In the United States patent document numbered US2014366927 of the known state of the art; a multi-source optimum configurable energy harvesting system is mentioned. The system can use the ambient RF energy, solar energy and the energy received from thermal sources in combination and can convert these into DC power which can be stored in a battery or which can be used for any another utilization.

However, in the harvesting systems in the exemplary documents, since there is no combined energy harvesting and communication management system which enables to obtain the optimum efficiency by providing a management strategy according to the information on the statistics of harvested energy, the present energy status and the energy consumption statistics; the need for developing the subject multi-source energy harvesting system has emerged.

SUMMARY

The purpose of this invention is to carry out a combined energy harvesting and communication management system which enables to obtain optimum efficiency by providing a management strategy according to the information on the statistics of harvested energy, the present energy status and the energy consumption statistics.

Another purpose of this invention is to provide a combined energy harvesting and communication management system which enables to obtain optimum efficiency by means of the configuration among the energy control interface, energy combiner, energy storage and transfer unit, memory, energy management unit, and the communication management unit.

Another purpose of this invention is to provide a multi-source combined energy harvesting and communication management system which enables energy for wireless devices/systems/networks by being integrated to each other according to the amount and requirements of energy.

In the system subject to the invention, multiple energy sources are used. The energy sources provide energy to the wireless devices by being integrated with each other according to the statistics of harvested energy, the amount of energy and the required the energy. The usage of two or more sources according to the variety of energy sources (sun light, RF, vibration, heat) that are present in the environment from which energy harvesting is planned to be made, makes it possible to both increase the total energy amount harvested and enables energy harvesting at any desired time. In the system subject to the invention, it is aimed not only to apply the combined energy harvesting and communication method on the basis of a device but also on the basis of the entire system/network. It is proposed for the devices and the communication network to be optimized according to need. This way, the suitable energy sources can be chosen with the management strategy created according to the application environment. In more broad terms, it is proposed that a common energy harvester which contains all energy sources on all devices is used. It is also possible to obtain energy from the same source by carrying out spatial diversity, besides energy harvesting by using more than one energy source.

BRIEF DESCRIPTION OF THE DRAWINGS

The combined multi-source energy harvesting and communication management system provided in order to accomplish the purpose of this invention is illustrated in the figures attached.

According to these figures.

Figure 1:
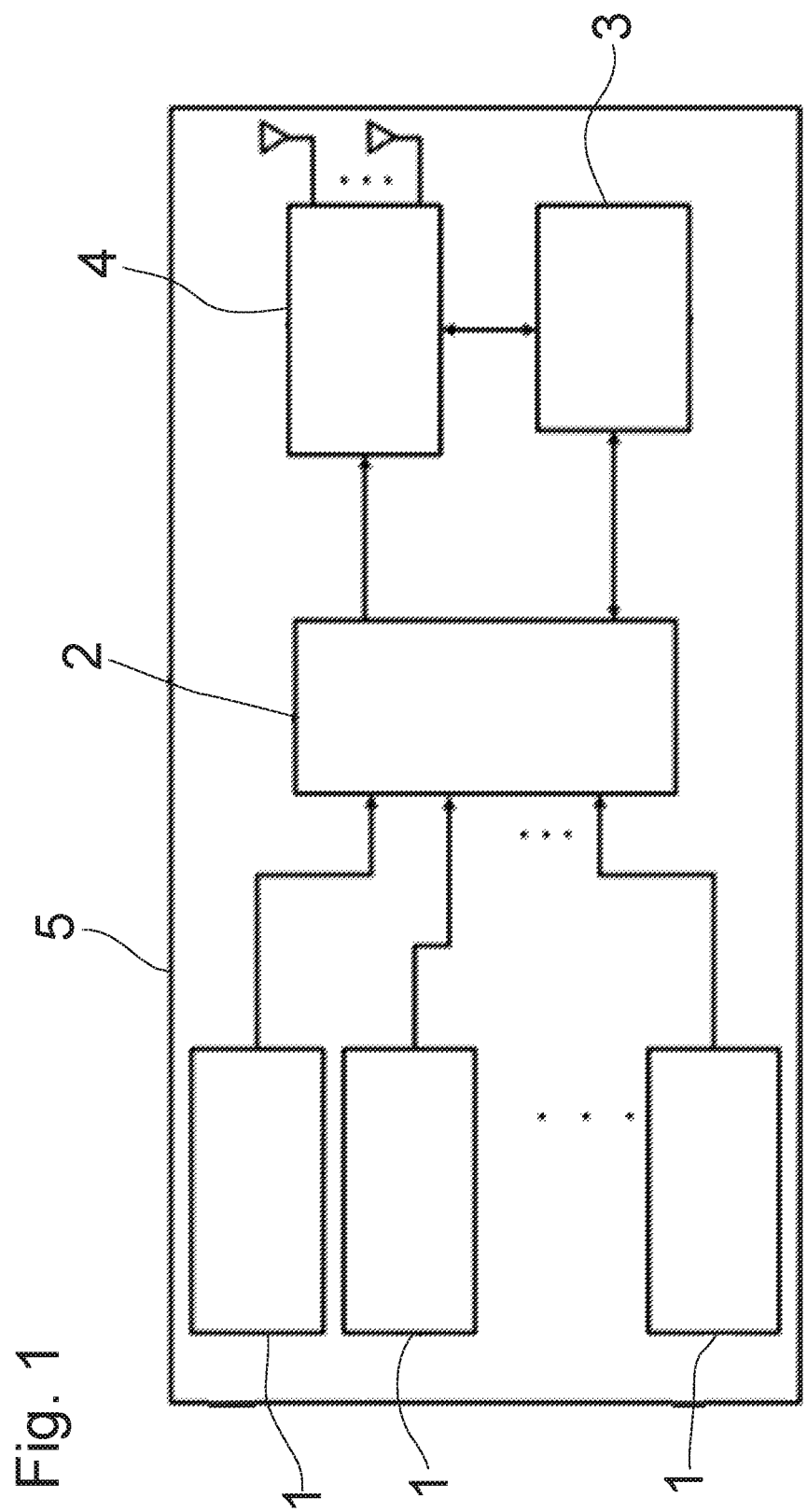
FIG. 1 shows a block diagram of the combined multi-source energy harvesting and communication management system subject to the invention.

The parts in the figures have been numbered one by one and the references of these figures are given in the below.

1. Energy Harvesting Module (EHM)
2. Energy Module (EM)
3. Management Module (MM)
4. Wireless Communication Module (WCM)
5. Smart Wireless Communication Device (S-WCD)
6. Energy Control Interface
7. Energy Combiner
8. Energy Storage and Transfer Unit
9. Memory
10. Energy Management Unit
11. Communication Management Unit
12. Managed Wireless Communication Device (M-WCD)
13. Management Device (MD)

DETAILED DESCRIPTION OF THE EMBODIMENTS

The invention is a combined multi-source energy harvesting and communication management system comprising;
energy harvesting modules (1) which enable to obtain energy from a single source, located in the smart wireless communication device (5),
energy module (2) which applies selection or combining procedures to the energy produced and transferred from various energy sources such as heat, light, mechanical and electromagnetic wave sources, located in the smart wireless communication device (5),
management module (3) which form energy combining and transfer strategy, in communication with the energy module (2) and the wireless communication module (4), located in the smart wireless communication device (5),
wireless communication module (4) which gives feedback related to the uplink and downlink energy consumption statistics and data communication requirements, which is in communication with the energy module (2) and the management module (3), located in the smart wireless communication device (5),
energy control interface (6) which is located in the energy module (2), in communication with the management module (3), energy combiner (7), energy storage and transfer unit (8), which transfers the energy combining strategy received from the management module (3) to the energy combiner (7) and the energy transfer strategy to the energy storage and transfer unit (8),
the energy combiner (7) which is located in the energy module (2), which transmits the statistics of the incoming and harvested energy to the energy control interface (6), which combines the energy received from different energy sources according to the combining strategy formed by the management module (3) and transmitted by the energy control interface (6) and which submits the obtained energy to the energy storage and transfer unit (8),
energy storage and transfer unit (8) which is located in the energy module (2), which stores the energy sent by the energy combiner (7), which transfers energy to the wireless communication module (4) according to the transfer strategy formed by the management module (3) and transmitted by the energy control interface (6), and which transfers the stored energy data to the energy control interface (6),
memory (9) which is located in the management module (3), composed of the permanent and temporary information storage units, in which the information that is required by the management module (3) such as costs, demand and budget is present,
energy management unit (10) which is a part of the management module (3), which evaluates the information obtained from the memory (9) and which is in communication with the energy module (2) and the management module (3), which forms the energy combining and transfer strategy,
communication management unit (11) which is a part of the management module (3), which determines the device configuration parameters by evaluating the combining and transfer strategy obtained from the energy management unit (10) with the up-to-date information obtained from the memory (9) unit, which transfers the device configuration parameters and the energy designation information to the wireless communication module (4).

The invention is a combined multi-source energy harvesting and communication management system according to an embodiment which comprises;
a managed wireless communication device (12) which is used in the centralized management model, which transfers the received, harvested and present energy information received from the user demand information to the management device (13),
a management device (13) which is used in the centralized management model, which obtains the incoming, harvested and present energy information that is obtained from the user demand data received from the managed wireless communication devices (12), which determine the combining and transfer strategy and the device configuration parameters by evaluating this information plus the present statistical information and transmits them to the managed wireless communication devices (12).

Figure 2:
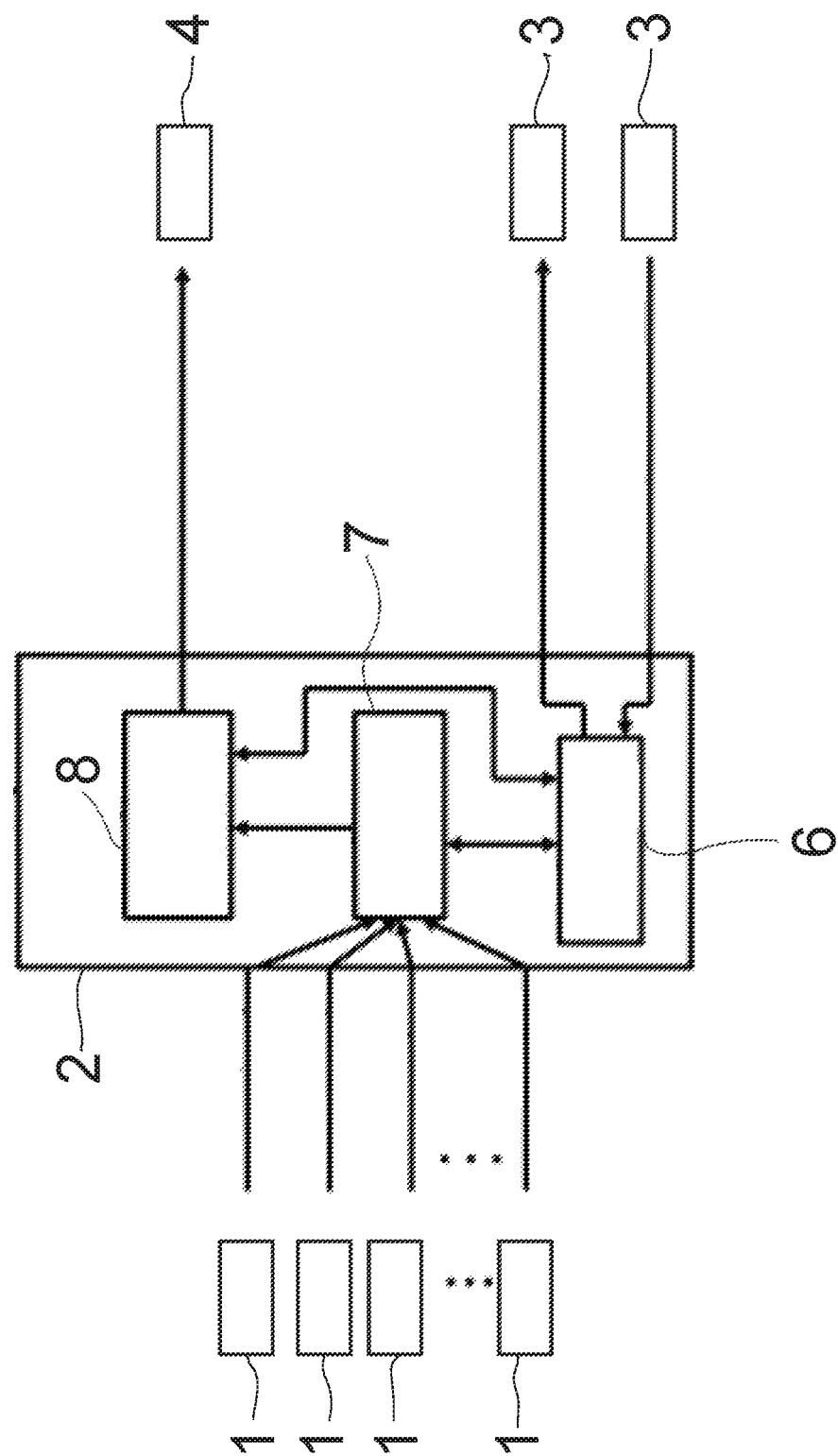
FIG. 2 shows a block diagram of the internal structure of the energy module in the combined multi-source energy harvesting and communication management system subject to the invention.

The block diagram of a smart wireless communication device (5) which provides energy harvesting from multiple sources in the distributed management model is shown in FIG. 1. Here, the energy received from various energy sources is transferred to the energy module (2) by means of N number energy harvesting modules (1). The block diagram of the internal structure of the energy module (2) is shown in FIG. 2. The energy module (2) submits the present energy status together with the statistical data of energy which is received from each energy source and harvested, to the energy control interface (6) and the management module (3).

Figure 3:
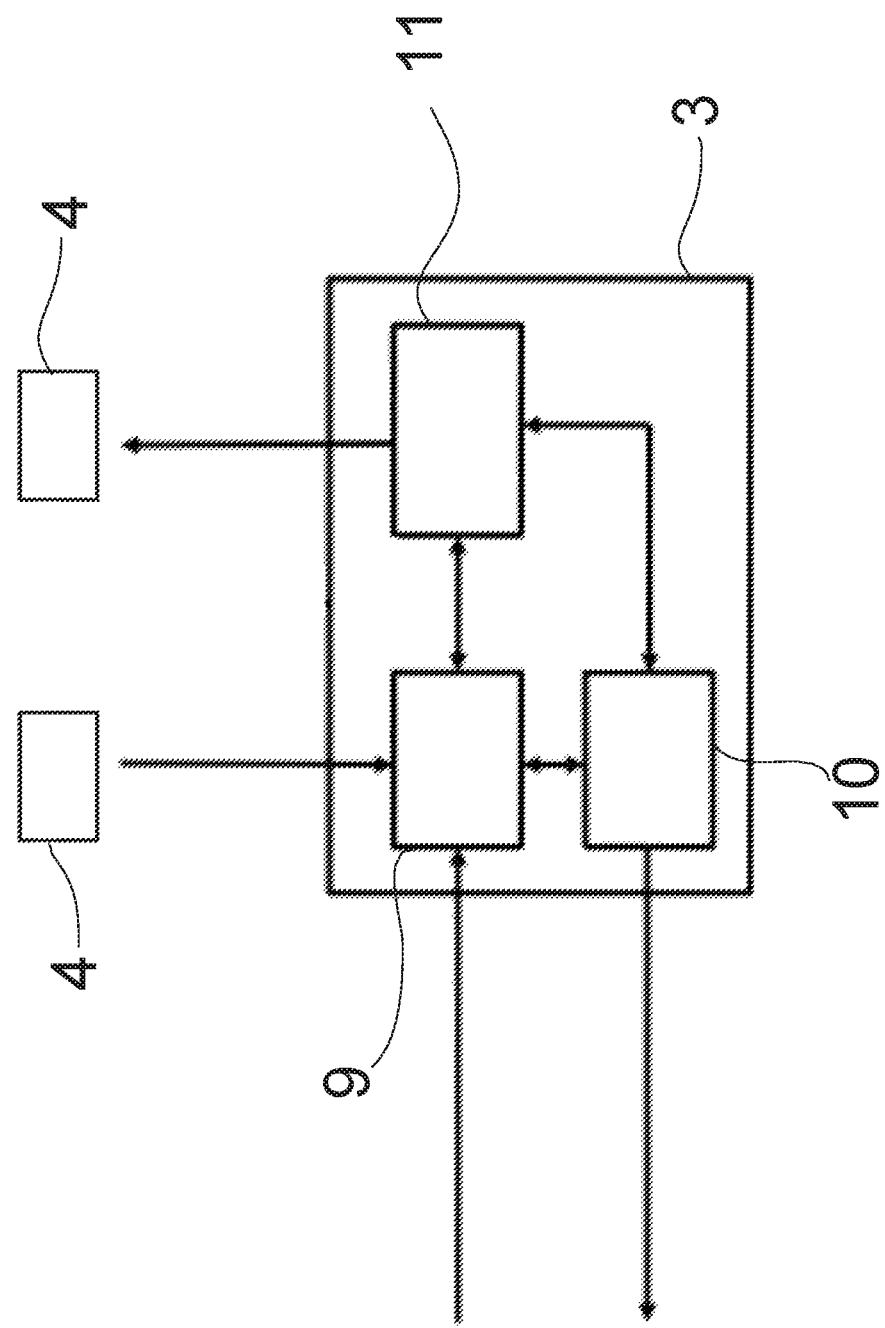
FIG. 3 shows a block diagram of the internal structure of the management module in the combined multi-source energy harvesting and communication management system subject to the invention.
Figure 4:
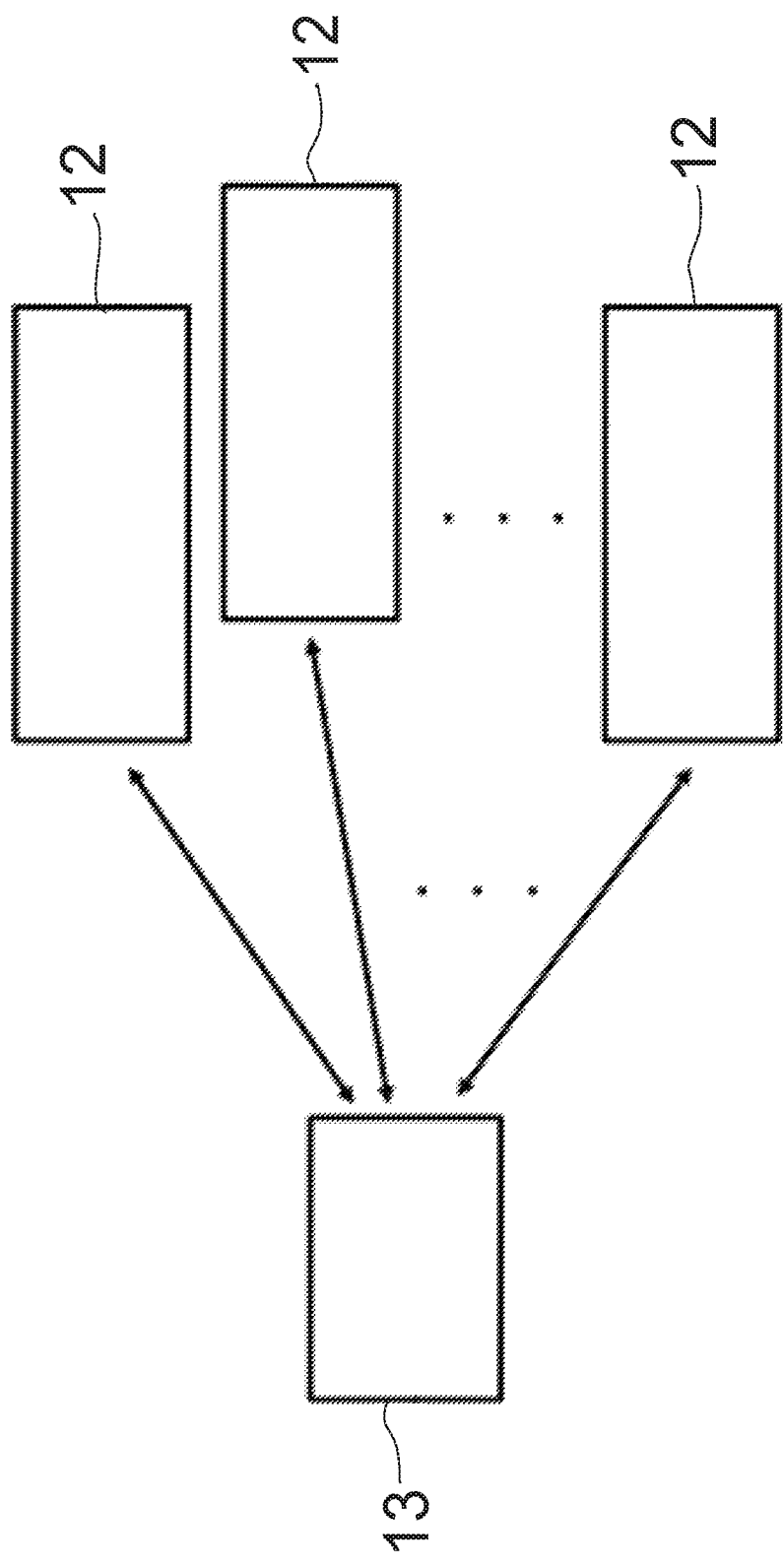
FIG. 4 shows a diagrammatic view of the combined multi-source energy harvesting and communication management system adapted to the centralized management model subject to the invention.

The block diagram of the internal structure of the management module (3) is shown in FIG. 3. By using this information, the management module (3) sends the combining and transfer strategy to the energy module (2), which includes which energy source, is going to be used or the way the energy received from the particular energy sources are going to be combined and transferred to the wireless communication module (4). The energy module (2) transfers the energy obtained to the wireless communication module (4), by combining the sources according to the combining and transfer strategy from the management module (3). The management module (3) sends the information regarding the energy designation amount decided according to the downlink and uplink energy consumption statistics, user demand statistics and the data communication requirement information from the communication module (4) and the energy amount to be harvested, and the information on the suitable device configuration parameters, to the wireless communication module (4). This way, a sustainable communication system is obtained by enabling optimum use of energy.

In the centralized management model which is another embodiment of the invention, there is one management device (13) and K numbers of managed wireless communication devices (12). In the managed wireless communication device (12), there is no management module (3) present. The function of the management module (3) in the distributed management model is fulfilled by the management device (13) in the centralized management model. The energy and transfer information received from the K number of wireless communication devices is evaluated by the management device (13) and the energy combining and transfer strategy, energy designation information and the device configuration parameters are sent to each managed wireless communication device (12) in order to be transferred to the energy module (2) and the wireless communication module (4).

In the environments where the communication between the management device (13) and the managed wireless communication device (12) can be carried out with low energy consumption, the central structure is more advantageous in terms of energy consumption; otherwise, the distributed structure is more advantageous.

In the case where there is no internal management module (3) present in the wireless communication devices, for the devices are managed by the central system. In this case, the incoming, harvested and present energy information that is received with the user demand data is obtained from the managed wireless communication devices (12). By evaluating this information and the present statistical information, the combining and transfer strategy and the device configuration parameters are determined and these parameters are transferred to the managed wireless communication devices (12). The management of the centrally managed wireless communication devices (12) from the management device (13) can be separate for each device and also can be obtained by performing a single broadcast for all devices according to the present situation. As an example to a single broadcast, a broadcast in which the maximum energy use is allowed for all the devices where the energy harvesting is sufficient or a broadcast which reports the energy conservation where the energy harvesting amount is low can be given.

What is claimed is:

1. A combined multi-source energy harvesting and communication management system, comprising:

a plurality of energy harvesting modules, wherein each energy harvesting module is configured to obtain energy only from a single energy source selected from a plurality of energy sources, located in a smart wireless communication device;

an energy module, which is a part of the smart wireless communication device, configured to apply selection or combining procedures to energy produced and transferred from the plurality of ambient energy sources in the environment including heat, light, mechanical, and electromagnetic wave sources;

a management module configured to form energy combining and transfer strategies, in communication with the energy module and a wireless communication module located in the smart wireless communication device;

the wireless communication module configured to provide a feedback related to uplink and downlink energy consumption statistics and data communication requirements, the wireless communication module is in communication with the energy module and the management module;

an energy control interface forming a part of the energy module in communication with the management module, an energy combiner, and an energy storage and transfer unit, the energy control interface is configured to transfer the energy combining strategy received from the management module to the energy combiner and the energy transfer strategy to the energy storage and transfer unit;

the energy combiner, which is a part of the energy module, transmits statistics of incoming and harvested energy to the energy control interface, the energy combiner combines the energy received from different energy sources according to the energy combining strategy formed by the management module and transmitted by the energy control interface, the energy combiner submits obtained energy to the energy storage and transfer unit;

the energy storage and transfer unit, which is a part of the energy module, stores the energy sent by the energy combiner, transfers energy to the wireless communication module according to the energy transfer strategy formed by the management module, and transfers energy data stored in the energy storage and transfer unit to the energy control interface;

a memory unit, which is a part of the management module, the memory unit is composed of permanent and temporary information storage units, the memory unit contains information required by the management module including costs, demand and budget information;

an energy management unit, which is a part of the management module, evaluates the information obtained from the memory unit and is in communication with the energy module and a communication management unit, the energy management unit forming an energy combining and transfer strategy;

the communication management unit, which is a part of the management module, determines device configuration parameters by evaluating the energy combining and transfer strategy obtained from the energy management unit with up-to-date information obtained from the memory unit, and transfers the device configuration parameters and energy designation information to the wireless communication module.

2. A combined multi-source energy harvesting and communication management system, comprising: a managed wireless communication device managed by a central system, the managed wireless communication device transfers energy information and user demand information to a management device;

the management device is managed by the central system, the management device obtains the energy information and the user demand information from the managed wireless communication device, the management device determines a combining and transfer strategy and device configuration parameters by evaluating the user demand information and present statistical information and transmits the combining and transfer strategy to the managed wireless communication device.

* * * * *